US012766839B2

(12) United States Patent
Yamaji et al.

(10) Patent No.: US 12,766,839 B2
(45) Date of Patent: Oct. 20, 2026

(54) LIQUID EJECTION HEAD AND METHOD OF PRODUCING THE SAME

(71) Applicant: CANON KABUSHIKI KAISHA, Tokyo (JP)

(72) Inventors: Haruka Yamaji, Tokyo (JP); Souta Takeuchi, Kanagawa (JP); Satoshi Kimura, Kanagawa (JP); Tamaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 18/646,354

(22) Filed: Apr. 25, 2024

(65) Prior Publication Data

US 2024/0375402 A1 Nov. 14, 2024

(30) Foreign Application Priority Data

May 11, 2023 (JP) ................................ 2023-078883

(51) Int. Cl.
*B41J 2/14* (2006.01)

(52) U.S. Cl.
CPC .............. *B41J 2/1433* (2013.01); *B41J 2/14* (2013.01); *B41J 2/14016* (2013.01); *B41J 2/14024* (2013.01); *B41J 2/1404* (2013.01); *B41J 2/1408* (2013.01); *B41J 2002/14443* (2013.01)

(58) Field of Classification Search
CPC ........ B41J 2/1433; B41J 2/14; B41J 2/14016; B41J 2/14024; B41J 2/1404; B41J 2/1408; B41J 2002/14443
See application file for complete search history.

(56) References Cited

U.S. PATENT DOCUMENTS

2011/0261112 A1* 10/2011 Okamura ............ B41J 2/14233 427/535

FOREIGN PATENT DOCUMENTS

JP 3108771 B2 11/2000

* cited by examiner

*Primary Examiner* — Geoffrey S Mruk
(74) *Attorney, Agent, or Firm* — VENABLE LLP

(57) ABSTRACT

Included are: a substrate configured to form a channel for a liquid to be ejected; an ejection port formation member configured to form an ejection port, the liquid having passed through the channel being ejected via the ejection port; a cover member configured to bond to the ejection port formation member at an opposite side to the substrate via an adhesive; and a thin film formed on a face of the cover member, the face being on a side where the cover member is bonded to the ejection port formation member, the thin film containing silicon carbide, or any of carbon-containing silicon oxide, silicon nitride, and silicon oxynitride.

8 Claims, 5 Drawing Sheets

LIQUID EJECTION HEAD AND METHOD OF PRODUCING THE SAME

BACKGROUND OF THE INVENTION

Field of the Invention

The present invention relates to a liquid ejection head by which liquid is ejected, and a production method thereof.

Description of the Related Art

A recording system using a liquid ejection head, which is typified by a recording head for ink jet printers, is to supply thermal energy and/or vibrational energy to liquid such as ink, eject the ink as microdroplets via ejection ports, and form images on a recording medium.

A liquid ejection head has a photosensitive resin layer forming ejection ports and channels are formed, and a substrate. The photosensitive resin layer forming ejection ports and channels is provided on the substrate. Feeding ports via which liquid is fed to the channels are formed in the substrate. The surface of the substrate, which is on the side where the channels and the ejection ports are provided, has energy generating elements. Liquid is fed via the feeding ports to the channels, energy is supplied to the liquid at the energy generating elements, and the liquid is ejected via the liquid ejection ports, and lands on a recording medium such as paper.

In recent years, it has been increasingly demanded that records of a higher resolution for commercial and industrial printing uses than the conventional be printed out at a higher speed on a printing apparatus such as an ink jet printer. However, in printing-out at a higher speed, sheets folded by paper jam or the like may come into contact with surfaces of ejection ports formed of a photosensitive resin layer of a liquid ejection head to damage the surfaces of the ejection ports.

Also demanded is robustness of a liquid ejection head of a printing apparatus such as an ink jet printer in fields for which there is increasing demand, in particular, an industrial printing field. Reinforcement of a base material is required in order not to damage ejection ports caused by paper jam.

Further, for achieving a high image quality, the range of options of liquids to be ejected is wider and wider for a printing apparatus such as an ink jet printer. Therefore, it is demanded to improve dissolution resistance of members that are to come into contact with ink.

Japanese Patent No. 3108771 suggests that a metallic material is adhered and bonded to laminate onto a substrate where an ejection port (nozzle) is formed, and thereby, the surface of the ejection port is guarded from sheets.

SUMMARY OF THE INVENTION

However, when, as in Japanese Patent No. 3108771, a metallic material is adhered and bonded on the surface of an ejection port in a liquid ejection head having an ejection port formed of a photosensitive resin layer, different kinds of members, that is, the metal member and the photosensitive resin layer are adhered. Therefore, cure shrinkage, difference in linear expansion, etc. easily make stress difference, and long-term contact with ink may separate an adhesive and a metallic material that has a poor sealing property to the adhesive from each other.

Simply, performance of dissolution resistance against ink from a general metallic material according to Japanese Patent No. 3108771 only is insufficient, and a head using a corrosion-resistant metal of higher dissolution resistance as a material thereof is demanded. However, it is being found that performance of dissolution resistance against an ink for high quality images which has been developed in recent years is not sufficient yet even when a member of a corrosion-resistant metal of higher dissolution resistance, such as stainless steel, is used.

More specifically, simply for improving robustness of a head, stainless steel that is an anti-corrosive metal is used for an ejection port protecting member, and the ejection port protecting member is adhered and bonded onto a nozzle plate. Then, it is being found that stainless steel on a bonding interface dissolves in ink, which separates an adhesive used for the bonding to decrease the adhesive strength of the ejection port protecting member.

An object of the present invention is to provide: a liquid ejection head that can lead to an improved sealing property of a metallic material and an adhesive that is applied to an ejection port face of the liquid ejection head, and an increased adhesive strength of an ejection port protecting member without original performance of dissolution resistance from a corrosion-resistant metal being impaired; and a method of producing such a liquid ejection head.

To achieve the aforementioned object, a liquid ejection head according to the present invention is provided with the following:

a substrate configured to form a channel for a liquid to be ejected;

an ejection port formation member configured to form an ejection port, the liquid having passed through the channel being ejected via the ejection port;

a cover member configured to bond to the ejection port formation member at an opposite side to the substrate via an adhesive; and a thin film formed on a face of the cover member, the face being on a side where the cover member is bonded to the ejection port formation member, the thin film containing silicon carbide, or any of carbon-containing silicon oxide, silicon nitride, and silicon oxynitride.

To achieve the aforementioned object, a method of producing a liquid ejection head according to the present invention wherein the liquid ejection head includes:

a substrate configured to form a channel for a liquid to be ejected;

an ejection port formation member configured to form an ejection port, the liquid having passed through the channel being ejected via the ejection port; and a cover member configured to bond to the ejection port formation member at an opposite side to the substrate via an adhesive to protect the ejection port, wherein the method of producing the liquid ejection head comprises:

forming a thin film on a face of the cover member, the face being on a side where the cover member is bonded to the ejection port formation member, the thin film containing silicon carbide, or any of carbon-containing silicon oxide, silicon nitride, and silicon oxynitride.

According to the present invention, a liquid ejection head in which a metallic material, and a face including an ejection port face of the liquid ejection head have an improved sealing property, and the adhesive strength of a cover member is increased can be provided.

Further features of the present invention will become apparent from the following description of exemplary embodiments with reference to the attached drawings.

DESCRIPTION OF THE EMBODIMENTS

Hereinafter modes for carrying out this invention will be illustratively described in detail based on embodiments with reference to the drawings. The dimensions, materials, and shapes of the components described in the embodiments, the relative positions thereof, etc. should be changed appropriately according to structure of apparatuses to which the invention is applied, and various conditions. Not all the combinations of the features described in these embodiments are always essential for the solution of the present invention. The components described in these embodiments are merely illustrative, and are not construed as limiting the scope of this invention thereto.

Embodiment 1

Figure 1A:
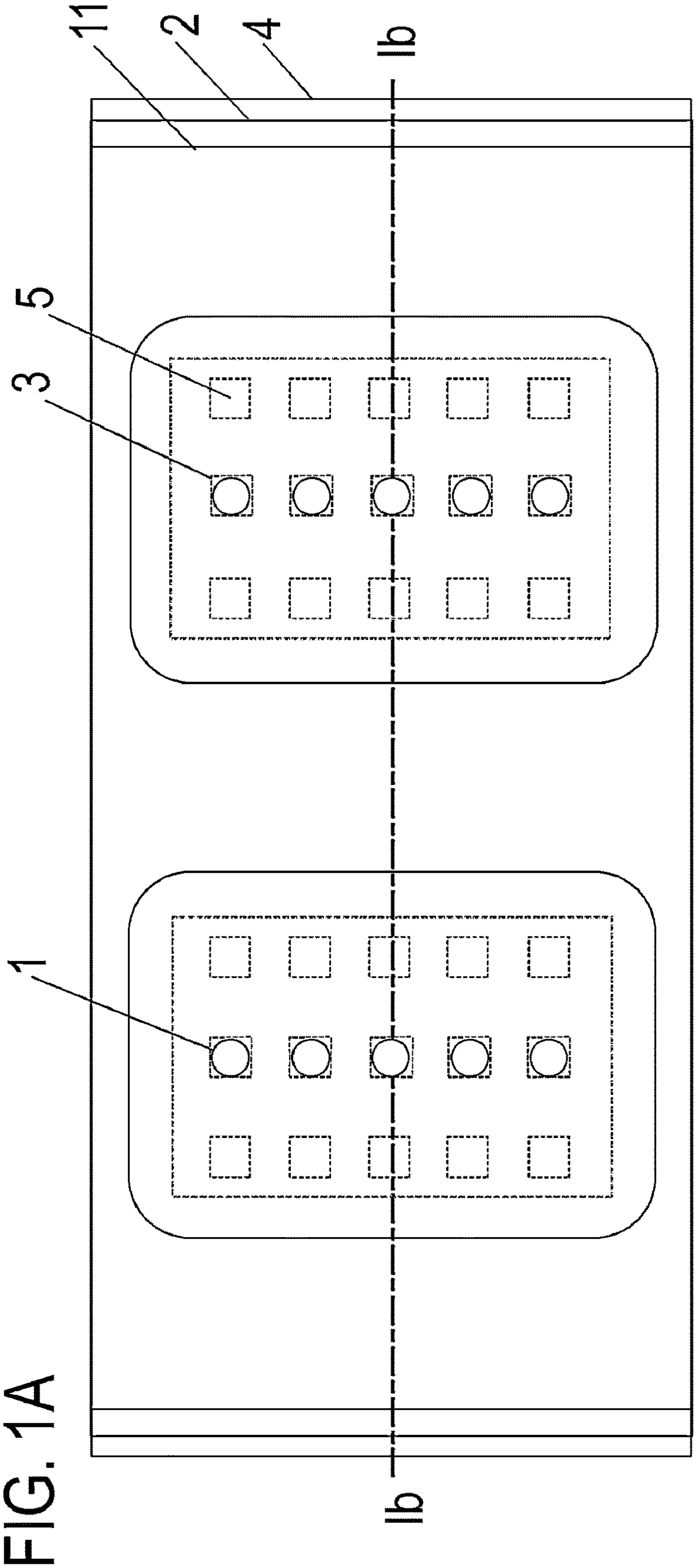
FIGS. 1A and 1B are structural views of a liquid ejection head according to embodiments 1 and 2.
Figure 1B:
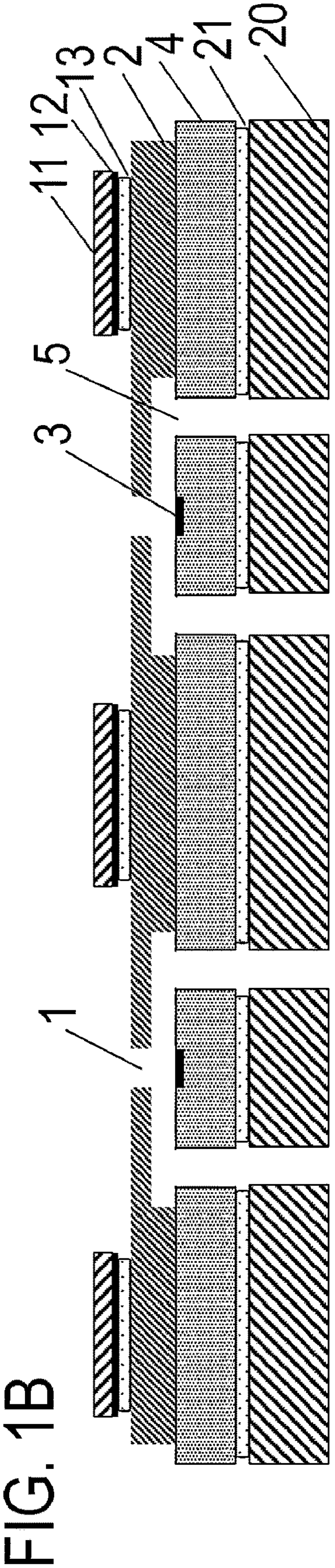

Hereinafter a substrate and a liquid ejection head for inkjet printing to which the present invention is applied will be described. FIGS. 1A and 1B show the embodiment where a substrate 4 is adhered and bonded to a head bonding member 20 to form a liquid ejection head. FIG. 1A is a plan view, and FIG. 1B is a cross-sectional view taken along the line Ib-Ib of FIG. 1A. In FIG. 1B, liquid ejection ports are shown upward.

Using the liquid ejection head of this embodiment, printing is done in such a way that the energy generated from energy generating elements (heaters) 3 causes liquid to flow from the head bonding member 20 into the substrate, and the liquid passes through feeding ports 5 and channels in the substrate, are ejected via ejection ports 1, and lands on a recording medium.

For causing liquid to flow into the substrate to feed the liquid, it is necessary to form a channel by which the substrate 4 communicates, and where liquid flows.

The method of making a hole for the communication is different according to a required shape thereof. Examples of the method of forming one large groove common to a plurality of lines of the ejection ports (lines of nozzles) in a row include anisotropic wet etching, methods using a laser, and sand blasting.

An example of the method of accurately forming a large number of small holes for lines of nozzles is dry etching using Deep-RIE.

Examples of the method of forming nozzles or ejection ports via which liquid is ejected include the method of forming a nozzle part, which is called an orifice plate, on the substrate by spin coating, and the method of forming the nozzles or ejection ports of any other members, and bonding them to the substrate, which will be described in detail later.

In this embodiment, a method using a photosensitive epoxy resin for an ejection port formation member is selected. The resin in the selected form of dry film is laminated. After the laminating, exposure, development, and cure baking are performed, and thereby, the nozzles or ejection ports are completed.

As described above, assuming that a printing apparatus such as an ink jet printer to which the liquid ejection head of the present invention is applied is used in, in particular, an industrial printing field, robustness of the head is demanded, and reinforcement of the base material is required in order not to damage the ejection ports 1 caused by paper jam.

Therefore, an ejection port protecting member (cover member) 11 is bonded immediately onto the ejection port formation member 2, and thereby, suppressing paper or the like from directly coming into contact with the ejection port formation member 2 even when the paper comes into contact with the surface of the head, and protects the ejection ports 1.

In this embodiment, the epoxy resin is selected as the material of the ejection port formation member 2, and a stainless steel member is selected as the material of the ejection port protecting member 11. An aim in the selection is to improve dissolution resistance against an ink that is a liquid to be ejected.

Any material having more mechanical strength than the epoxy resin may be used for the ejection port protecting member 11 because the aim of providing the ejection port protecting member 11 is to protect the ejection port formation member 2, and candidates thereof are a silicon substrate and a metal member. Among them, in view of dissolution resistance against ink, a corrosion-resistant metal such as stainless steel, aluminum alloys, titanium alloys, and nickel alloys is more desirable as the material of the ejection port protecting member 11.

Bonding with an adhesive 13 is selected for bonding the ejection port formation member 2 and the ejection port protecting member 11 because bonding to the ejection port protecting member 11 can be carried out without any contact with or any change in the once completed ejection ports 1. While, naturally, selection of an adhesive depends on bonding members, an adhesive capable of bonding all of the head bonding member 20 that is a member using a ceramic, the substrate 4 that is a member using silicon, and the ejection port formation member 2 using a resin such as an epoxy resin, and that has sufficient resistance against ink is used. In view of ink resistance, an adhesive containing an epoxy resin as a base compound, and using a curing catalyst and an acid anhydride is preferable.

As an epoxy resin used for the adhesive, an alicyclic epoxy resin, an aromatic epoxy resin, an aliphatic epoxy resin, or the like may be used.

Examples of an alicyclic epoxy resin as used herein include the following: cyclohexene oxide structure-containing compounds obtained by epoxidizing polyglycidyl ether or cyclohexene of polyhydric alcohol having at least one alicyclic ring or a cyclopentene ring-containing compound with an oxidizing agent; and vinylcyclohexane oxide structure-containing compounds obtained by epoxidizing a cyclopentene oxide structure-containing compound or a compound having a vinylcyclohexane structure with an oxidizing agent. Examples of the foregoing include hydrogenated bisphenol A diglycidyl ether, 3,4-epoxycyclohexylmethyl-3,4-epoxycyclohexyl carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-methadioxane, bis (3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexylcarboxylate, methylenebis(3,4-epoxycyclohexane), dicyclopentadiene diepoxide, ethyleneglycol di(3,4-epoxycyclohexylmethyl)ether, ethylenebis(3,4-epoxycyclohexane carboxylate), epoxy hexahydrophthalic acid dioctyl, and epoxy hexahydrophthalic acid di-2-ethylhexyl.

Specific examples of an aromatic epoxy resin as used herein are the following: polyhydric phenols having at least one aromatic ring or polyglycidyl ethers of alkylene oxide adducts thereof, or having a naphthalene ring, e.g., bisphenol A, bisphenol F, or glycidyl ether, epoxy novolak resin, bisphenol A novolac diglycidyl ether, and bisphenol F novolac diglycidyl ether which are compounds obtained by further adding alkylene oxide thereto.

Specific examples of an aliphatic epoxy resin as used herein are the following: aliphatic polyhydric alcohols or polyglycidyl ethers of alkylene oxide adducts thereof, polyglycidyl esters of long-chain aliphatic polybasic acids, epoxy group-containing compounds obtained by oxidizing long-chain aliphatic unsaturated hydrocarbons with an oxidizing agent, homopolymers of glycidyl acrylates or glycidyl methacrylates, and copolymers of glycidyl acrylates or glycidyl methacrylates. Examples of typical compounds of the foregoing include: glycidyl ethers of polyhydric alcohols, such as 1,4-butanediol diglycidyl ether, 1,6-hexanediol diglycidyl ether, triglycidyl ether of glycerine, triglycidyl ether of trimethylolpropane, tetraglycidyl ether of sorbitol, hexaglycidyl ether of dipentaerythritol, diglycidyl ether of polyethylene glycol, and diglycidyl ether of polypropylene glycol; polyglycidyl ethers of polyether polyols obtained by adding one or at least two alkylene oxides to aliphatic polyhydric alcohols, such as propylene glycol and glycerine; and diglycidyl esters of long-chain aliphatic dibasic acids.

Further examples of the foregoing include: monoglycidyl ethers of aliphatic higher alcohols, phenol, cresol, butylphenol, monoglycidyl ethers of polyether alcohols obtained by adding alkylene oxide thereto, glycidyl esters of higher fatty acids, epoxidized soybean oil, epoxy octyl stearate, epoxy butyl stearate, and epoxidized linseed oil.

In such a viewpoint that it is necessary for an adhesive selectable in the present invention to satisfy the aforementioned requirements, the adhesive is not limited to that selected in this embodiment. In this embodiment, the adhesive same as a back substrate adhesive 21 is used as the adhesive 13.

For the purpose of improving adhesiveness, an adhesiveness improving layer 12 is formed on an adhering and bonding face of the ejection port protecting member 11 which is on the side where the ejection port formation member 2 is bonded (opposite side to the substrate 4). Adhesiveness to the adhesive 13 is important for this adhesiveness improving layer 12. Thus, the adhesiveness improving layer 12 is preferably an adhesiveness improving layer containing silicon oxide where the content of oxygen (O) is at least 5% to silicon (Si).

Further, in view of ink resistance of the adhesiveness improving layer itself, the proportion of oxygen to silicon is preferably not more than 50%. That is, it is preferable that the adhesiveness improving layer 12 be formed from a thin film containing silicon oxide, and the proportion of oxygen (O) to silicon (Si) in silicon oxide is at least 5% and not more than 50%. In this embodiment, the adhesiveness improving layer 12 is formed so that the proportion of O to Si is 25%.

The film thickness may be such that the adhesiveness improving layer 12 can be optically recognized as a film, that is, at least approximately 30 nm. It is also important not to deform the stainless steel member that serves as the base material. In view of the balance between the foregoing, the adhesiveness improving layer 12 is preferably a thin film having a film thickness of not more than approximately 100 nm. That is, the thickness of the adhesiveness improving layer 12 is desirably at least 30 nm and not more than 100 nm.

In view of characteristics of the adhesiveness improving layer 12, it is advantageous to raise compressive stress as film stress as long as warp from the stainless steel member of the ejection port protecting member 11 that serves as the base material is not generated. Desirably, the compressive stress is at least 300 MPa and not more than 700 MPa.

FIGS. 2A to 2H show structure and a producing method of the substrate 4 and the liquid ejection head corresponding to embodiment 1 of the present invention. Portions corresponding to those in FIGS. 1A and 1B are denoted by the same reference signs as in FIGS. 1A and 1B. Hereinafter the substrate 4, and the method of producing the liquid ejection head will be described in detail.

Figure 2A:
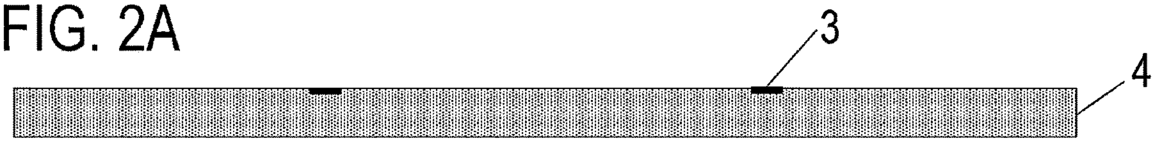
FIGS. 2A to 2H illustrate a method of producing the liquid ejection head according to embodiment 1.

As shown in FIG. 2A, the silicon substrate 4 having a thickness of 500 μm, and having, on the surface side thereof, built-in energy generating elements 3 and driving circuit (not shown) that includes semiconductor devices and wiring is prepared.

Figure 2B:
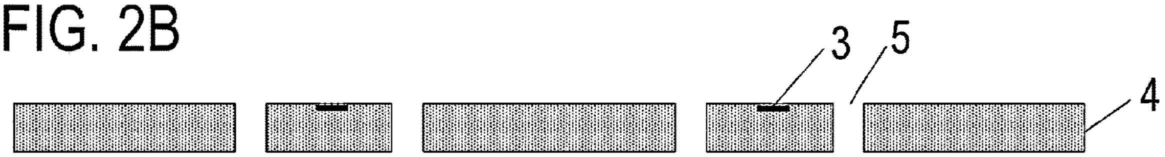

Next, as shown in FIG. 2B, dug holes of 50×50 μm each are formed by etching the substrate 4 from the surface side to form the feeding ports 5. In this embodiment, Deep-RIE of alternately performing etching and film formation is used using $SF_6$ and $C_4F_8$ as etching gas.

Figure 2C:
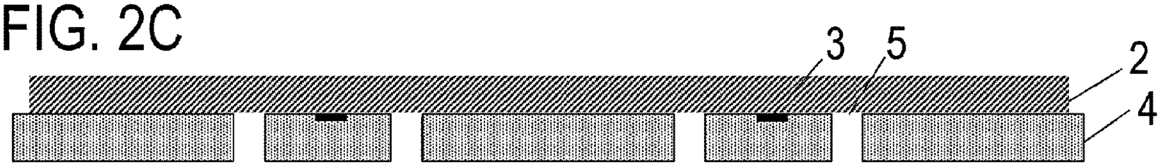

Next, as shown in FIG. 2C, a dry film containing the photosensitive epoxy resin that serves as the ejection port formation member 2 is laminated onto the substrate 4.

Figure 2D:
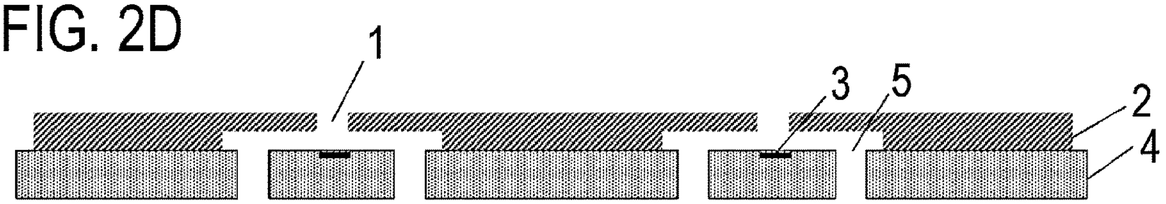

Further, as shown in FIG. 2D, the photosensitive dry film is separated into several parts, exposed, and developed, and thereby, forms the channels and the ejection ports 1 where liquid flows. Here, the steps for forming the ejection ports 1 are once completed.

Figure 2E:

Next, as shown in FIG. 2E, the stainless steel member having a thickness of 30 μm, and shaped as another component is prepared as the ejection port protecting member 11. The shape of the stainless steel member is processed by resist forming and wet etching by the use of photoetching. In this embodiment, a member having a thickness of 30 μm is used. However, the thickness is not limited to this. Preferably, the thickness is at least 10 μm and not more than 50 μm.

Figure 2F:

Next, as shown in FIG. 2F, a SiOC film is formed to have a thickness of 50 nm on a back face of the ejection port protecting member 11 so that the proportion of O to Si is 25%, to form the adhesiveness improving layer 12 of a thin film. In this embodiment, the film is formed by plasma CVD among vacuum deposition methods by the use of $SiH_4$ and $CH_4$ as film formation gas.

Figure 2G:
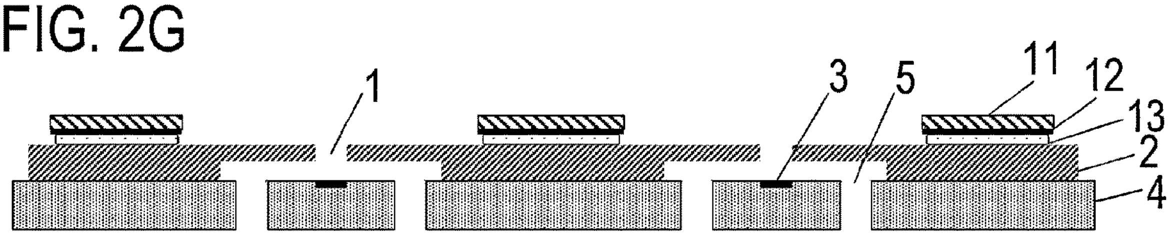

Next, as shown in FIG. 2G, the ejection port protecting member 11 with the adhesiveness improving layer 12 formed as another member is adhered and bonded to the ejection port formation member 2 with the adhesive 13.

Figure 2H:
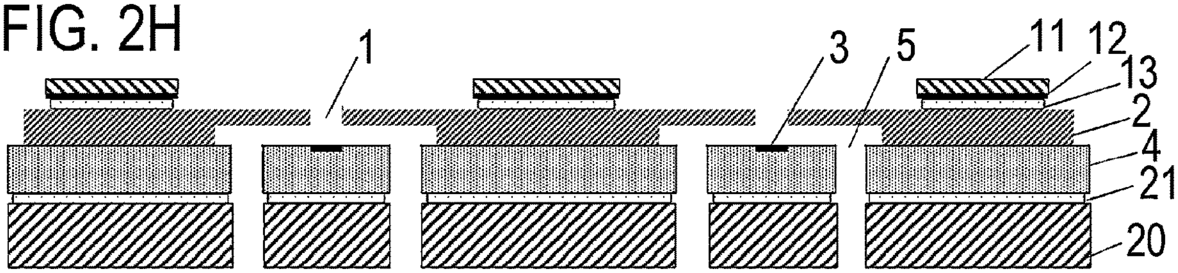

Last, as shown in FIG. 2H, the substrate 4 is adhered and bonded to the head bonding member 20 with the back substrate adhesive 21 to form the liquid ejection head.

Here, features of embodiment 1 according to the present invention will be described. In this embodiment, a SiOC film as the adhesiveness improving layer 12 is formed so that Si:O is 100:25 as described above. The film is formed by plasma CVD by the use of $SiH_4$ and $CH_4$ as film formation gas.

Even when an ink proof test and an ink dipping test were carried out on the liquid ejection head of this embodiment, the adhesive 13 and the ejection port protecting member 11 did not separate from each other, and thus, no breaking was caused. As a result, no product breaking of the liquid ejection head occurred.

For comparison, the ejection port protecting member 11 was adhered and bonded to the ejection port formation member 2 with the adhesive 13 without any formation of a SiOC film that was the adhesiveness improving layer on a back face of the stainless steel member as the ejection port protecting member 11, and the same ink proof test and the same ink dipping test were carried out.

Thus, ink penetrated the interface between the adhesive and the stainless steel member to lower the adhesive strength. As a result, it was found that when used as the ejection port protecting member 11 without any formation of a SiOC film, the stainless steel member could not sufficiently exercise the function of protecting the ejection ports.

For comparison, the ejection port protecting member 11 was formed using a silicon substrate which is naturally low resistant to ink, a SiOC film that was the adhesiveness improving layer was formed on a back face thereof, the resultant was adhered and bonded to the ejection port formation member 2 with the adhesive 13, and the same ink proof test and the same ink dipping test were carried out.

Thus, only a part where the SiOC film was formed did not dissolve, and the adhesive strength of the silicon substrate did not lower.

It is noted that a part where the SiOC film was not formed dissolved, and lowered performance as the ejection port protecting member 11 was found.

Comparative Example 1

Figure 3A:
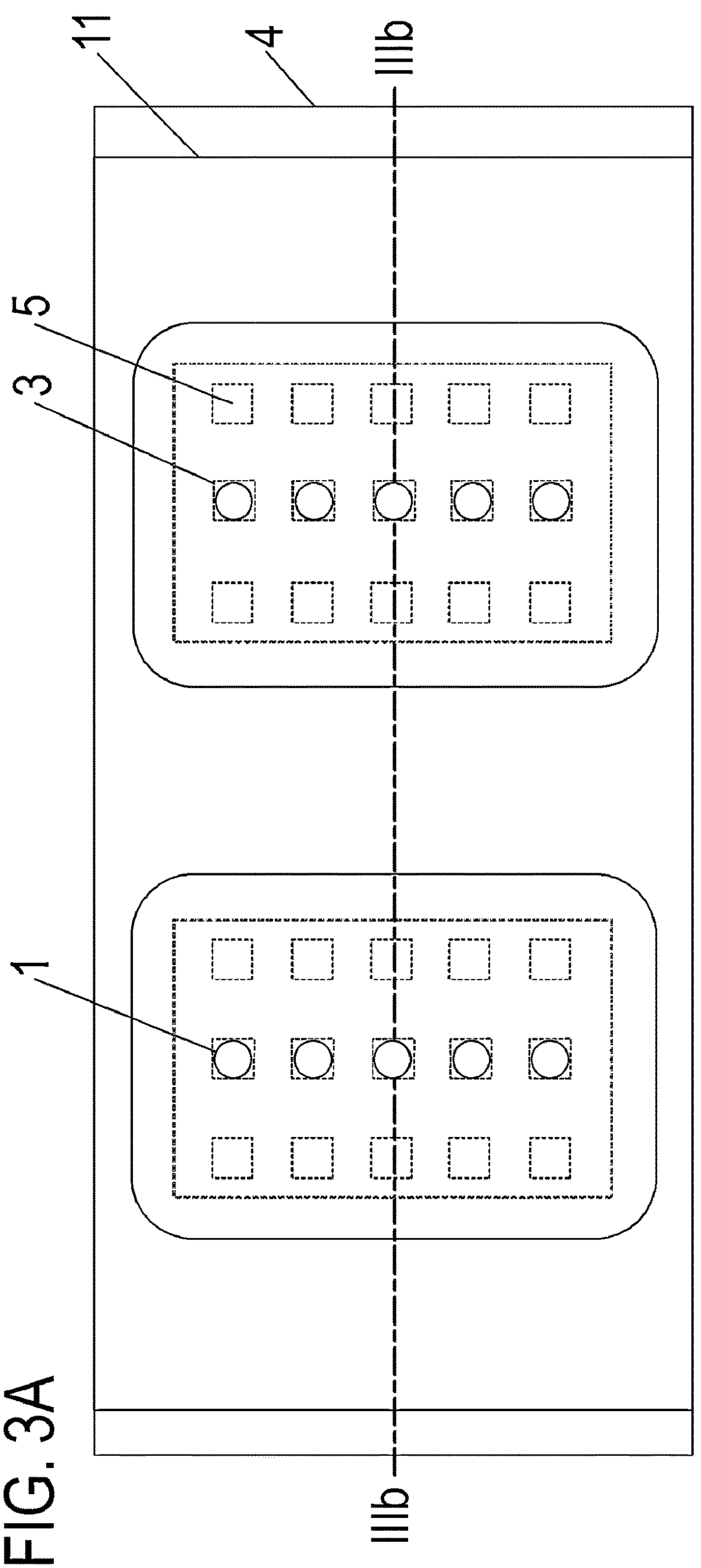
FIGS. 3A and 3B are structural views of a liquid ejection head according to comparative example 1 and embodiment 3.
Figure 3B:
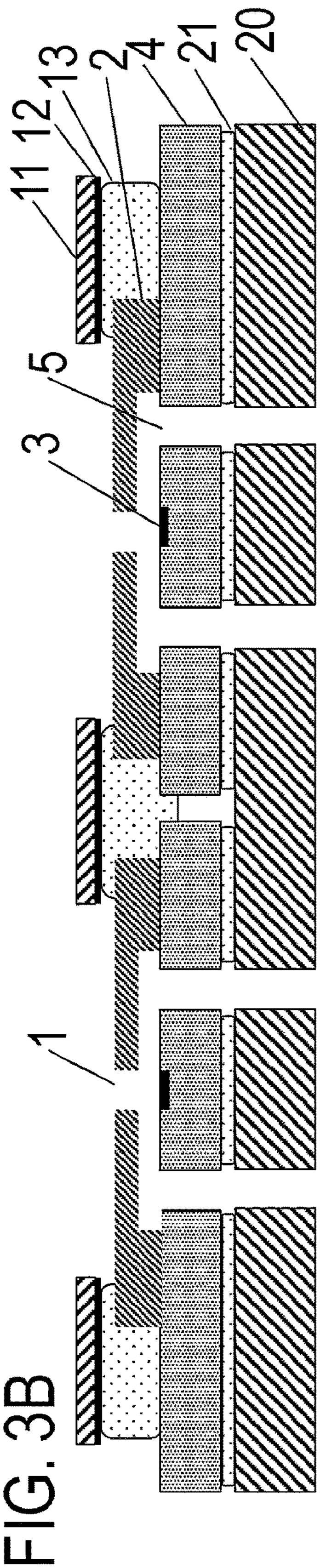

FIGS. 3A to 3B and FIGS. 4A to 4H show structure and a producing method of the substrates 4 and the liquid ejection head corresponding to comparative example 1 of the present invention. Corresponding parts in FIGS. 3A to 3B and FIGS. 4A to 4H are denoted by the same reference signs. FIG. 3B is a cross-sectional view taken along the line IIIb-IIIb of FIG. 3A. Hereinafter the substrates 4, and the method of producing the liquid ejection head will be described in detail. In comparative example 1, as shown in FIG. 3B, two substrates 4 laterally aligned in one liquid ejection head.

Figure 4A:
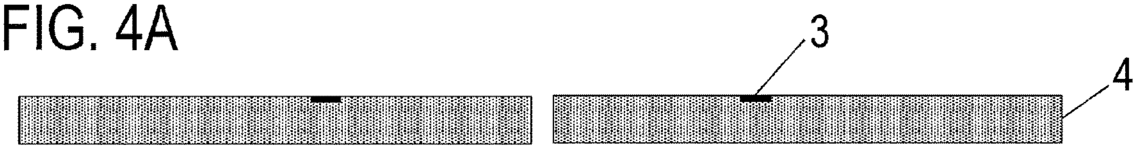
FIGS. 4A to 4H illustrate a method of producing the liquid ejection head according to comparative example 1 and embodiment 3.

As shown in FIG. 4A, the silicon substrates 4 each having a thickness of 500 μm, and each having, on the surface side thereof, a built-in energy generating element 3 and driving circuit (not shown) that included semiconductor devices and wiring was prepared.

Figure 4B:
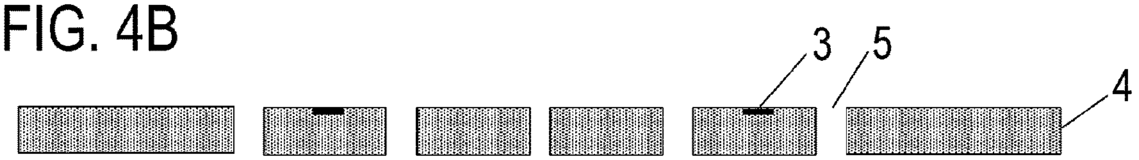

Next, as shown in FIG. 4B, dug holes of 50×50 μm each were formed by etching the substrates 4 from the surface sides to form the feeding ports 5. As well as example 1, Deep-RIE of alternately performing etching and film formation was used using $SF_6$ and $C_4F_8$ as etching gas.

Figure 4C:
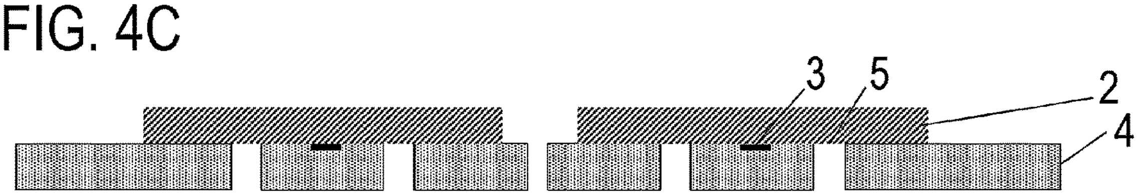

Next, as shown in FIG. 4C, a dry film containing the photosensitive epoxy resin that served as the ejection port formation member 2 was laminated onto each of the substrates 4.

Figure 4D:
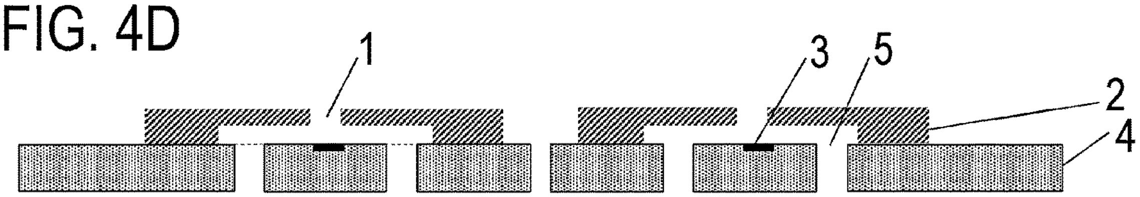

Next, as shown in FIG. 4D, the photosensitive dry film was separated into several parts, exposed, and developed, and thereby, as well as embodiment 1, formed the channels and the ejection ports 1 where liquid flows.

Figure 4E:
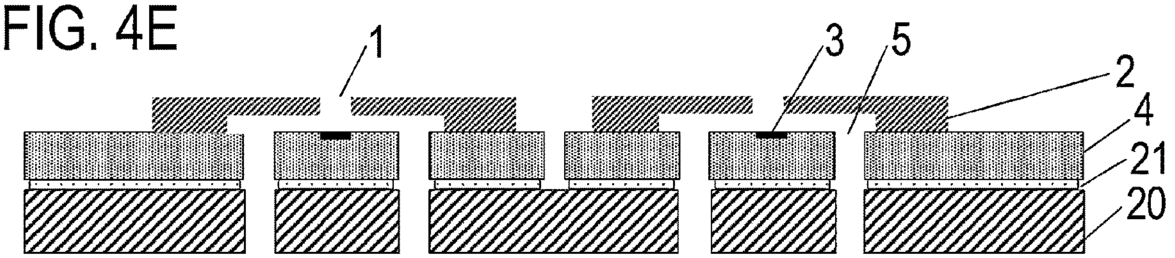

Next, as shown in FIG. 4E, the laterally aligned two substrates 4 were adhered and bonded to the one head bonding member 20 with the back substrate adhesive 21. Here, the steps of bonding the two substrates 4, where the ejection ports 1 were formed, to the one liquid ejection head were once completed.

Figure 4F:

Next, as shown in FIG. 4F, the stainless steel member having a thickness of 30 μm, and shaped as another component was prepared as the ejection port protecting member 11. The shape of the stainless steel member was processed by resist forming and wet etching by the use of photoetching. For comparison with embodiment 1, a member having a thickness of 30 μm was similarly used.

Figure 4G:

Next, as shown in FIG. 4G, a SiOC film was formed to have a thickness of 100 nm over a back face of the ejection port protecting member 11 so that the proportion of O to Si was 4%, that is, Si:O was 100:4, to form the adhesiveness improving layer 12. In comparative example 1, SiOC was used as a film formation target, and the film was formed by bias RF sputtering among vacuum deposition methods.

Figure 4H:
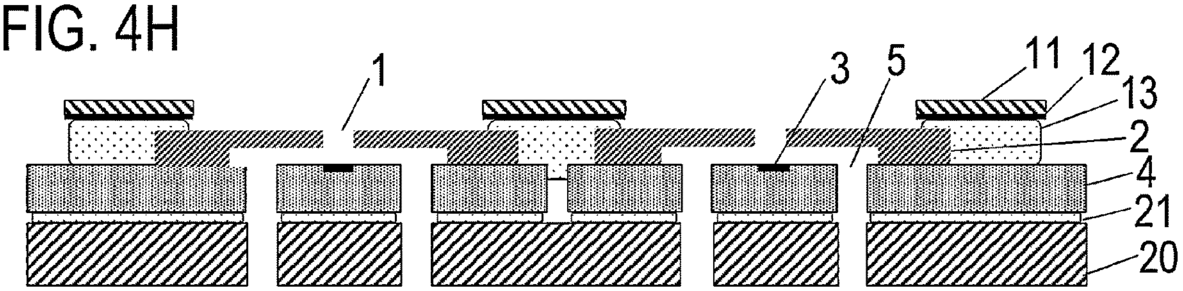

Next, as shown in FIG. 4H, the ejection port protecting member 11 with the adhesiveness improving layer 12 formed as another member was adhered and bonded to the ejection port formation member 2 with the adhesive 13 to form a liquid ejection head.

As a result of carrying out an ink proof test and an ink dipping test on the liquid ejection head of comparative example 1, long-term ink dipping caused ink to penetrate through the interface between the adhesiveness improving layer and stainless steel, which caused separation. In comparative example 1, the SiOC film was formed as the adhesiveness improving layer so that Si:O was 100:4. The reason why the ink penetrated the interface is considered to be because the lower the proportion of the presence of oxygen which contributed to the adhesion in the film was, the lower the adhesive force on the interface was.

Comparative Example 2

Figure 5A:
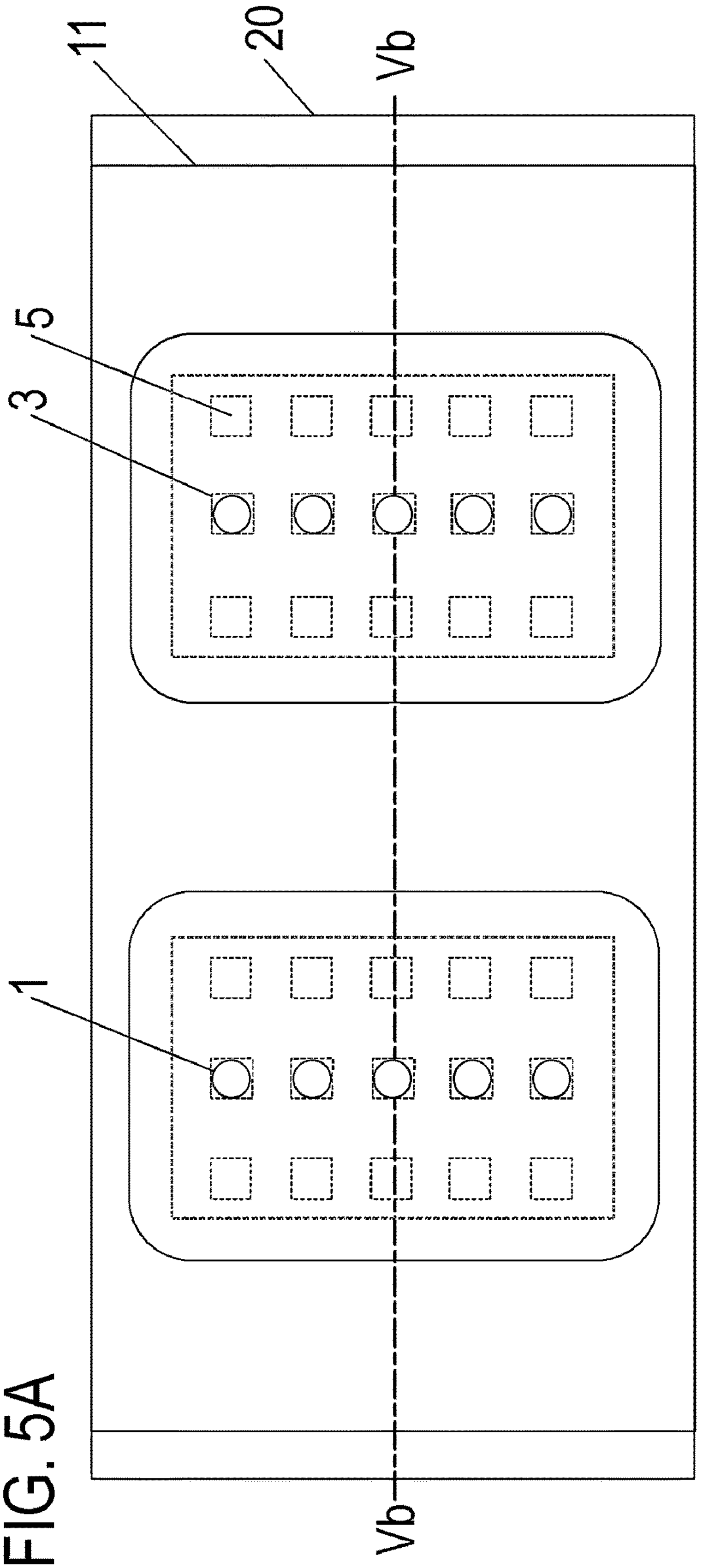
FIGS. 5A and 5B are structural views of a liquid ejection head according to comparative example 2 and embodiment 4.
Figure 5B:
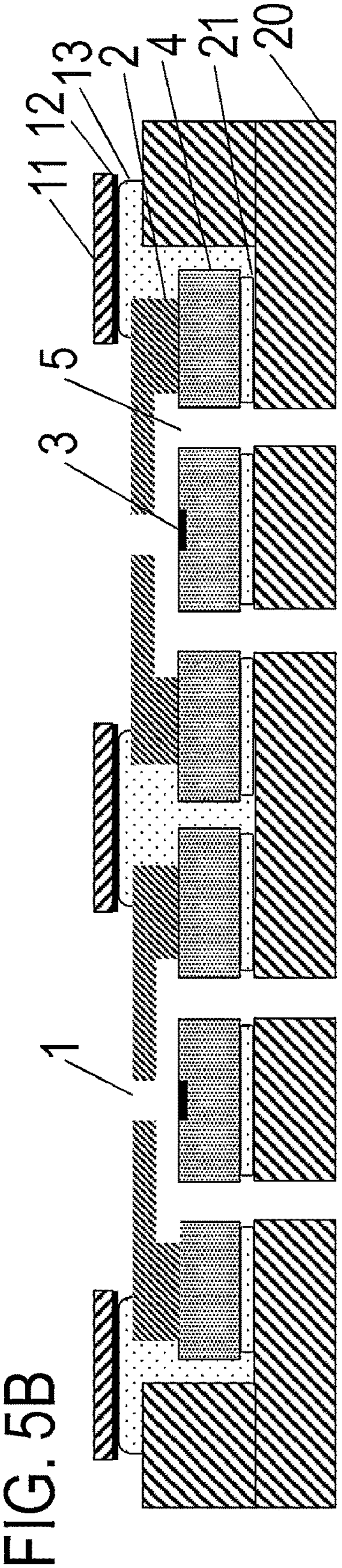

FIGS. 5A and 5B show structure of the substrates 4 and the liquid ejection head corresponding to comparative example 2 of the present invention. FIG. 5B is a cross-sectional view taken along the line Vb-Vb of FIG. 5A. In comparative example 2, two substrates 4 also laterally aligned in one ejection head. In comparative example 2, the substrates 4, the ejection port formation member 2, and the ejection port protecting member 11 were the same as in embodiment 1, and comparative example 1, and thus, the description of the substrates 4, and the method of producing the liquid ejection head is omitted.

In comparative example 2, a SiOC film was formed to have a thickness of 30 nm so that Si:O was 100:55, to form the adhesiveness improving layer 12. In comparative example 2, the film was formed by plasma CVD by the use of $SiH_4$ and $CH_4$ as film formation gas.

As a result of carrying out an ink proof test and an ink dipping test on the liquid ejection head of comparative example 2, long-term ink dipping caused the SiOC film that served as the adhesiveness improving layer to dissolve, which caused separation. In comparative example 2, the SiOC film was formed to have a thickness of 30 nm so that Si:O was 100:55. Therefore, it is considered that when the proportion of the presence of oxygen was excessive, ink resistance of the film itself lowered, and the film easily dissolved in ink.

Embodiment 2

A substrate and a liquid ejection head for inkjet printing of embodiment 2 will be described. FIGS. 1A and 1B show the embodiment where the substrate 4 is adhered and bonded to the head bonding member 20 to form a liquid ejection head. The structure as the substrate and the liquid ejection head is almost the same as in embodiment 1, and thus, parts different from those in embodiment 1 will be described.

As well as in embodiment 1, the shape of the ejection port protecting member 11 as another member is processed in advance by photoetching using resist forming and wet etching. Thereafter, the adhesiveness improving layer 12 is formed on a back face of the ejection port protecting member 11 for the purpose of enhancing bonding with an adhesive.

Here, because resistance against ink is important for this adhesiveness improving layer 12, the adhesiveness improving layer 12 is desirably a carbon-containing silicon-based thin film, that is, a thin film of silicon carbide, or a thin film containing any of carbon-containing silicon oxide, silicon nitride, and silicon oxynitride unlike embodiment 1. More specifically, any of SiC, SiOC, SiCN and SiOCN may be selected according to an ink required. In this embodiment, a thin film formed from SiC and having a thickness of 50 μm is formed by plasma CVD by the use of $SiH_4$ and $CH_4$ as film formation gas. The film thickness and the compressive stress are also the same as in embodiment 1, and thus, the description thereof is omitted here.

As the film formation by plasma CVD at this time, triode film formation where 13.56 MHz is applied to a shower head from a RF power supply as HF, and 380 KHz is applied to a platen from a RF power supply as LF is selected.

Further, for increasing the adhesive force to the surface of stainless steel, the HF power applied to the shower head is reduced, and the LF power applied to the platen is increased. The compressive stress is adjusted to be 500 MPa, and the conditions of HF/LF/pressure are set to be in 100 W/200 W/100 Pa, respectively, so that the film is formed.

By plasma CVD, the pressure in the film formation is approximately 100 Pa, which is not so high as a degree of vacuum in film formation. Therefore, the degree of vacuum can be stably kept constant irrespective of degassing from contaminants on the surface of stainless steel, especially from contaminants of organic substances, and a film can be stably formed, which is advantageous.

A film can be formed at a low temperature that is closer to normal temperature and is not more than 100° C. by triode film formation. Thus, the film is formed at 60° C. so that behaviors to invite faults in film formation and transfer, such as stretching and warp of the stainless steel member which are caused by temperature difference, can be avoided.

The formed SiC film has a thickness of 50 nm, which is thin. Therefore, even when the compressive stress is set at 500 MPa, which is relatively high, the stainless steel member of the base material does not deform, and the formed SiC film functions well as the adhesiveness improving layer 12.

Even when an ink proof test and an ink dipping test were carried out on the ejection head of this embodiment, peel failure or product breaking did not occur.

For comparison, the ejection port protecting member 11 was adhered and bonded to the ejection port formation member 2 with the adhesive 13 without any formation of a SiC film that was the adhesiveness improving layer on a back face of the stainless steel member as the ejection port protecting member 11, and the same ink proof test and the same ink dipping test were carried out.

Then, it was confirmed that the interface of the stainless steel member adhered to the adhesive dissolved in ink to separate the adhesive, and the adhesive strength of the stainless steel member lowered. As a result, it was found that when used as the ejection port protecting member 11 without any formation of a SiC film, the stainless steel member could not sufficiently exercise the function of protecting the ejection ports.

For comparison, the ejection port protecting member 11 was formed using a silicon substrate which is naturally low resistant to ink, a SiC film that was the adhesiveness improving layer was formed on a back face thereof, the resultant was adhered and bonded to the ejection port formation member 2 with the adhesive 13, and the same ink proof test and the same ink dipping test were carried out.

Thus, only a part where the SiC film was formed did not dissolve, and the adhesive strength of the silicon substrate did not lower.

It is noted that a part where the SiC film was not formed dissolved, and lowered performance as the ejection port protecting member 11 was found.

Embodiment 3

FIGS. 3A to 3B and FIGS. 4A to 4H show structure and a producing method of the substrates 4 and the liquid ejection head corresponding to embodiment 3 of the present invention. Corresponding parts in FIGS. 3A to 3B and FIGS. 4A to 4H are denoted by the same reference signs. Hereinafter the substrates, and the method of producing the head will be described. The production method is basically the same as in comparative example 1, and thus, parts different from those in comparative example 1 will be described.

Features of embodiment 3 of the present invention will be described. In this embodiment, a SiC film is formed to have a thickness of 100 nm as the adhesiveness improving layer 12. The film is formed by bias RF sputtering by the use of SiC as a film formation target.

As sputtering, a SiC target of a parallel plate is prepared, and bias RF sputtering by RF power supply application and DC power supply application is carried out. The film is formed under the conditions that the RF power is set in 500 W, the bias power is set in 50 W, and the compressive stress is adjusted to be 0.5 Pa.

Generally, for sputtering, reverse sputtering is performed as pretreatment for removing contaminants on the surface of stainless steel, especially organic contaminants. However, in this embodiment, sputtering is performed without reverse sputtering because in case of stainless steel, chromium oxide on the surface thereof is removed, and corrosion resistance that is a characteristic of stainless steel deteriorates.

To avoid behaviors to invite faults in film formation and transfer, such as stretching and warp of the stainless steel member which are caused by temperature difference, the film is formed without heating the substrate.

In this embodiment, the formed SiC film has a thickness of 100 nm, which is thicker than that in embodiment 2, and therefore, the compressive stress thereof is set to limited to 300 MPa, which is a medium level. Then, the stainless steel member of the base material does not deform, and the formed SiC film functions well as the adhesiveness improving layer 12.

In this embodiment, unlike in embodiment 1, the two substrates 4 are adhered and bonded to the one head, and thereafter, the one ejection port protecting member 11 is adhered and bonded to the two substrates 4. At this time, not the entire face of the ejection port protecting member 11 which is adhered and bonded with the adhesive 13 faces the ejection port formation member 2. A part where no ejection port formation member 2 is present faces any of the substrates 4, and on some part, the ejection port protecting member 11 is adhered and bonded to any of the substrates 4 via the adhesive 13.

However, even when formation of the adhesiveness improving layer 12 on the entire back face of the ejection port protecting member 11 changes a face and/or a material to be bonded as in this embodiment, the effect of the adhesiveness improving layer on the adhesive 13 does not change, that is, is well.

Even when an ink proof test and an ink dipping test were carried out on the ejection head of this embodiment, peel failure or product breaking did not occur as in embodiment 2.

Embodiment 4

FIGS. 5A and 5B show structure of substrates and a head corresponding to embodiment 4 of the present invention. In embodiment 4, the structure of the substrates 4, the ejection port formation member 2, and the ejection port protecting member 11 are the same as those used in embodiment 3, and thus, parts different from other embodiments will be described below.

In this embodiment shown in FIGS. 5A and 5B, a SiC film of 30 nm is formed to form the adhesiveness improving layer 12. In this embodiment, the film is formed by plasma CVD by the use of $SiH_4$ and $CH_4$ as film formation gas.

As shown in FIGS. 5A and 5B, the head bonding member 20 is not flat, but the height of an outward extending portion thereof is more so that the substrates 4 can be fit in. The head bonding member 20 is bonded to a back face of the ejection port protecting member 11 with the adhesive 13.

Features of embodiment 4 of the present invention will be described. The formed SiC film has a thickness of 30 nm, which is thinner than in embodiment 2. Thus, the compressive stress thereof is set in 650 MPa to further enhance the adhesive force to the surface of the stainless steel. The film is formed under the HF/LF/pressure conditions of 100 W/200 W/50 Pa.

Nevertheless, the stainless steel member of the base material does not deform, and the formed SiC film functions well as the adhesiveness improving layer 12.

In this embodiment, as well as embodiment 3 and unlike embodiment 1, the two substrates 4 are adhered and bonded to the one head, and thereafter, the one ejection port protecting member 11 is adhered and bonded to the two substrates 4. At this time, not the entire face of the ejection port protecting member 11 which is adhered and bonded with the adhesive 13 faces the ejection port formation member 2. A part where no ejection port formation member 2 is present faces the head bonding member 20, and on some part, the ejection port protecting member 11 is adhered and bonded to the head bonding member 20 via the adhesive 13.

Even when formation of the adhesiveness improving layer 12 on the entire back face of the ejection port protecting member 11 changes a face and/or a material to be bonded as in this embodiment, the effect of the adhesiveness improving layer on the adhesive 13 does not change, that is, is well.

Even when an ink proof test and an ink dipping test were carried out on the ejection head of this embodiment, peel failure or product breaking did not occur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-078883, filed on May 11, 2023, which is hereby incorporated by reference herein in its entirety.

What is claimed is:

1. A liquid ejection head comprising:

a substrate configured to form a channel for a liquid to be ejected;

an ejection port formation member configured to form an ejection port, the liquid having passed through the channel being ejected via the ejection port;

a cover member configured to bond to the ejection port formation member at an opposite side to the substrate via an adhesive; and a thin film formed on a face of the cover member, the face being on a side where the cover member is bonded to the ejection port formation member, the thin film containing silicon carbide, or any of carbon-containing silicon oxide, silicon nitride, and silicon oxynitride, wherein the thin film contains the silicon oxide, and a proportion of oxygen to silicon in the silicon oxide is 5% to 50%.

2. The liquid ejection head according to claim 1, wherein a proportion of silicon and oxygen in the thin film is 100:25.

3. A liquid ejection head comprising:

a substrate configured to form a channel for a liquid to be ejected;

an ejection port formation member configured to form an ejection port, the liquid having passed through the channel being ejected via the ejection port;

a cover member configured to bond to the ejection port formation member at an opposite side to the substrate via an adhesive; and a thin film formed on a face of the cover member, the face being on a side where the cover member is bonded to the ejection port formation member, the thin film containing silicon carbide, or any of carbon-containing silicon oxide, silicon nitride, and silicon oxynitride, wherein the ejection port formation member is comprised of a material containing an epoxy resin, and the cover member is comprised of a material containing silicon or a metal.

4. The liquid ejection head according to claim 3, wherein the cover member is comprised of a material containing a corrosion-resistant metal.

5. The liquid ejection head according to claim 4, wherein the cover member is comprised of a material containing any of stainless steel, an aluminum alloy, a titanium alloy, and a nickel alloy.

6. The liquid ejection head according to claim 3, wherein the thin film has a thickness of at least 30 nm and not more than 100 nm.

7. The liquid ejection head according to claim 3, wherein the thin film has a film stress of 300 MPa to 700 MPa as a compressive stress.

8. A liquid ejection head comprising:

a substrate configured to form a channel for a liquid to be ejected;

an ejection port formation member configured to form an ejection port, the liquid having passed through the channel being ejected via the ejection port;

a cover member configured to bond to the ejection port formation member at an opposite side to the substrate via an adhesive; and a thin film formed on a face of the cover member, the face being on a side where the cover member is bonded to the ejection port formation member, the thin film containing silicon carbide, or any of carbon-containing silicon oxide, silicon nitride, and silicon oxynitride, wherein the cover member has a thickness of 10 μm to 50 μm.

* * * * *